United States Patent Office 2,855,418
Patented Oct. 7, 1958

2,855,418

PROCESS FOR PRODUCING HEAVY METAL ETHYLENE-BIS-DITHIOCARBAMATES

Pierre Mugnier, Lyon, France, assignor to Progil, Paris, France, a corporation of France No Drawing. Application January 17, 1955
Serial No. 482,417

Claims priority, application France January 17, 1954

8 Claims. (Cl. 260—429)

This invention relates to a process for producing heavy metal ethylene-bis-dithiocarbamates and, more particularly, relates to producing new and improved fungicides.

It has already been proposed to prepare dithiocarbamates by reacting carbon disulfide with ethylene diamine in the presence of a strong base, such as for example a hydroxide of lithium, sodium, potassium, barium or strongly basic quaternary ammonium. Such reactions may be typified by the formation of sodium ethylene-bis-dithiocarbamates by the following reaction:

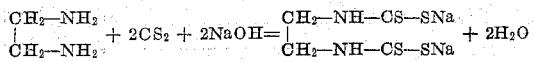

This sodium dithiocarbamate may be reacted with a salt of a heavy metal, typified by copper, zinc, manganese and the like to give the dithiocarbamates of the corresponding metal. However, the yields are rather poor since they generally do not exceed 70–75%, based upon the amount of ethylene diamine used. Also, the product obtained is, in general, colored and contains a substantial amount of sulfur either in the form of mineral or organic compounds. The amount of sulfur present in forms other than in the form of the carbamates may reach 5–6%. Such by-product sulfur compounds not only constitute a loss but may be considered contaminants.

In accordance with the present invention, new and improved fungicides, especially suitable as agricultural fungicides, are provided comprising heavy metal ethylene-bis-dithiocarbamates of exceptional fineness and unusual stability which advantageously contain very small or low percentages of by-product sulfur compounds. The novel and improved fungicides of this invention are obtained by an improved process for the preparation of dithiocarbamates from ethylene diamine in which the ethylene diamine is reacted with carbon disulfide in the presence of a weak base such as, for example, a solution of ammonia, instead of in the presence of a strong base in accordance with prior art practice. Apparently the strong base has the effect of lowering yields and causing the formation of sulfides. The ammonium ethylene-bis-dithiocarbamate is obtained in accordance with the following reaction:

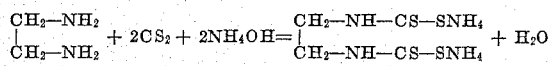

The formation of the heavy metal salts may be typified by the formation of a zinc salt, such as in a reaction involving zinc chloride. The reaction is considered to take place as follows:

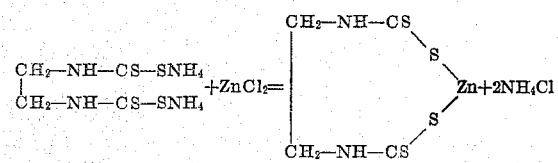

The zinc ethylene-bis-dithiocarbamate obtained in the foregoing manner is a finely divided white product and is much more easily separated from the solution than when the corresponding zinc salt is prepared from say sodium ethylene-bis-dithiocarbamate in accordance with prior art practices. The yield, based upon ethylene diamine, is of the order of 83–85% and the recovered product contains less than 1% of sulfur in the form of secondary compounds. The product has exceptional value as an agricultural fungicide.

While the foregoing example has concerned itself with zinc ethylene-bis-dithiocarbamate, it will be understood that other heavy metal ethylene-bis-dithiocarbamates, such as those derived from the aforesaid copper, manganese and the like heavy metals, may be produced in a like manner with kindred advantageous results.

The following examples will further illustrate the invention but are not to be considered a limitation thereupon.

EXAMPLE 1

*Ammonium ethylene-bis-dithiocarbamate*

One hundred sixty grams of carbon disulfide are added, under stirring, to a mixture composed of: 1700 grams of water, 130 grams of ammonia solution containing 29% by weight of ammonia, and 95.5 grams of ethylene diamine in the form of an aqueous solution containing 63% by weight of the ethylene diamine. After the addition of carbon disulfide is completed, the mixture is stirred for an additional two hours while its temperature is kept below 45° C. In this manner 2080 grams of a solution of ammonium ethylene-bis-dithiocarbamate in water are obtained. This solution may be used as such for the production of heavy metal ethylene-bis-dithiocarbamates.

EXAMPLE 2

*Zinc ethylene-bis-dithiocarbamate*

Seventeen hundred grams of a solution containing 10% of zinc chloride are added under strong stirring to the solution of ammonium ethylene-bis-dithiocarbamate prepared in Example 1, and precipitation is readily completed by stirring the solution for an additional ten minutes. After filtering to recover the precipitate, washing the material on the filter and drying the product, a crude product containing 230 grams of zinc ethylene-bis-dithiocarbamate is obtained. A yield of 83.5% based upon the amount of ethylene diamine used is thus obtained.

As compared to zinc ethylene-bis-dithiocarbamate obtained from sodium ethylene-bis-dithiocarbamate, or like salts of strong bases, the product obtained in this example is more finely divided, has substantially increased stability and has improved color characteristics being a white product containing less than 1% of sulfur in the form of secondary compounds. These physical properties of the product of this example render the product especially suitable for use as an agricultural fungicide.

EXAMPLE 3

*Manganese ethylene-bis-dithiocarbamate*

By following the procedures of Example 2, manganese ethylene-bis-dithiocarbamate is obtained with like qualities and like utility. More particularly, 1260 grams of a solution containing 10% manganese chloride are added to 2090 grams of ammonium ethylene-bis-dithiocarbamate solution and the reaction carried out as in Example 2. Upon filtering and washing and drying the precipitate, 225 grams of manganese ethylene-bis-dithiocarbamate are obtained. The yield is 85% based upon the amount of ethylene diamine used in the formation of the ammonium salt.

It will be understood that the present invention is not limited to the specific embodiments hereinbefore discussed but extends to all modifications thereof which will occur to those skilled in the art upon consideration of the general disclosure, its illustrative details and the scope of the claims appended hereto.

What is claimed is:

1. A process for producing heavy metal ethylene-bis-dithiocarbamates comprising forming a salt of ethylene-bis-dithiocarbamic acid and a weak base by reacting ethylene diamine with carbon disulfide in an aqueous medium in the presence of a weak base and then reacting the formed salt in an aqueous medium with a salt of a heavy metal.

2. A process for producing heavy metal ethylene-bis-dithiocarbamates comprising forming ammonium ethylene-bis-dithiocarbamate by reacting ethylene diamine with carbon disulfide in an aqueous medium in the presence of ammonium hydroxide and then reacting the formed ammonium salt in an aqueous medium with a water soluble salt of a heavy metal.

3. A process for producing zinc ethylene-bis-dithiocarbamate comprising forming ammonium ethylene-bis-dithiocarbamate by reacting ethylene diamine with carbon disulfide in an aqueous medium in the presence of ammonium hydroxide and then reacting the formed ammonium salt in an aqueous medium with a water soluble salt of zinc.

4. A process for producing manganese ethylene-bis-dithiocarbamate comprising forming ammonium ethylene-bis-dithiocarbamate by reacting ethylene diamine with carbon disulfide in an aqueous medium in the presence of ammonium hydroxide and then reacting the formed ammonium salt in an aqueous medium with a water soluble salt of manganese.

5. A process for producing a salt of ethylene-bis-dithiocarbamic acid and a weak base comprising reacting ethylene diamine with carbon disulfide in an aqueous medium in the presence of a weak base whereby said salt is obtained in high yield and by-product sulfur compounds are produced in low yield.

6. A process for producing ammonium ethylene-bis-dithiocarbamate comprising reacting ethylene diamine with carbon disulfide in an aqueous medium in the presence of an aqueous solution of ammonia whereby the ammonia salt is obtained in high yield and by-product sulfur is obtained in low yield.

7. A process for producing heavy metal ethylene-bis-dithiocarbamates comprising reacting a salt of ethylene-bis-dithiocarbamic acid and a weak base with a water soluble salt of a heavy metal in an aqueous medium whereby finely divided stable heavy metal ethylene-bis-dithiocarbamates are obtained.

8. A process for producing heavy metal ethylene-bis-dithiocarbamates comprising reacting ammonium ethylene-bis-dithiocarbamate with a water soluble heavy metal salt in an aqueous medium whereby finely divided stable heavy metal ethylene-bis-dithiocarbamates are obtained.

References Cited in the file of this patent

UNITED STATES PATENTS

| | | |
|---|---|---|
| 2,229,562 | Gracia | Jan. 21, 1941 |
| 2,609,389 | Flenner | Sept. 2, 1952 |